United States Patent [19]

Smitley

[11] 3,994,359
[45] Nov. 30, 1976

[54] SAFETY SHUT-OFF FUEL SYSTEM

[75] Inventor: Marion L. Smitley, Birmingham, Mich.

[73] Assignee: Colt Industries Operating Corporation, New York, N.Y.

[22] Filed: June 6, 1975

[21] Appl. No.: 584,581

[52] U.S. Cl. .................................. 180/104; 137/38
[51] Int. Cl.² .................... B60K 15/08; B60K 28/00
[58] Field of Search ............ 180/82 R, 103 BF, 104; 123/198 D, 198 DB; 137/38, 41, 42

[56] References Cited
UNITED STATES PATENTS

| | | | |
|---|---|---|---|
| 1,789,110 | 1/1931 | Muehleisen | 180/104 |
| 2,163,988 | 6/1939 | Stacey | 180/104 X |
| 2,258,323 | 10/1941 | Gray | 180/104 |
| 2,619,185 | 11/1952 | Rudisill | 180/104 |
| 3,521,652 | 7/1970 | Reeks | 123/198 D X |
| 3,620,204 | 11/1971 | Baltadonis | 123/198 D |
| 3,807,423 | 4/1974 | Engel | 137/38 |
| 3,840,036 | 10/1974 | Renk | 180/104 X |
| 3,915,255 | 10/1975 | Springer | 180/104 |

Primary Examiner—M. H. Wood, Jr.
Assistant Examiner—Terrance L. Siemens

[57] ABSTRACT

An automotive fuel system which has a fuel tank, a fuel pump, a fuel metering device for metering fuel flow to an associated fuel-consuming engine, and a fuel reservoir (such as, for example, a carburetor fuel bowl), has a valving assembly interposed generally between the outlet of the fuel pump and the fuel reservoir with such valving assembly being responsive to, for example, the associated vehicle experiencing a crash impact or a roll-over condition whereupon such valving assembly becomes effective to prevent the further flow of fuel from the fuel pump into the fuel reservoir.

3 Claims, 3 Drawing Figures

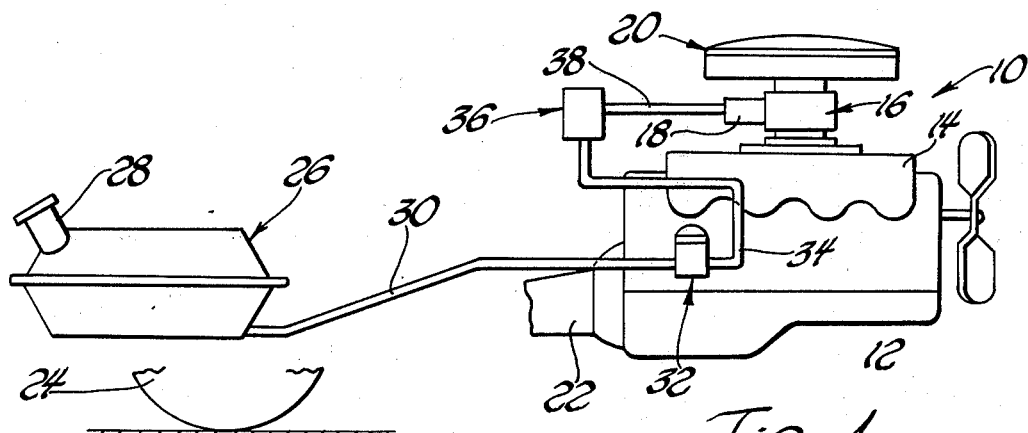
Fig. 1
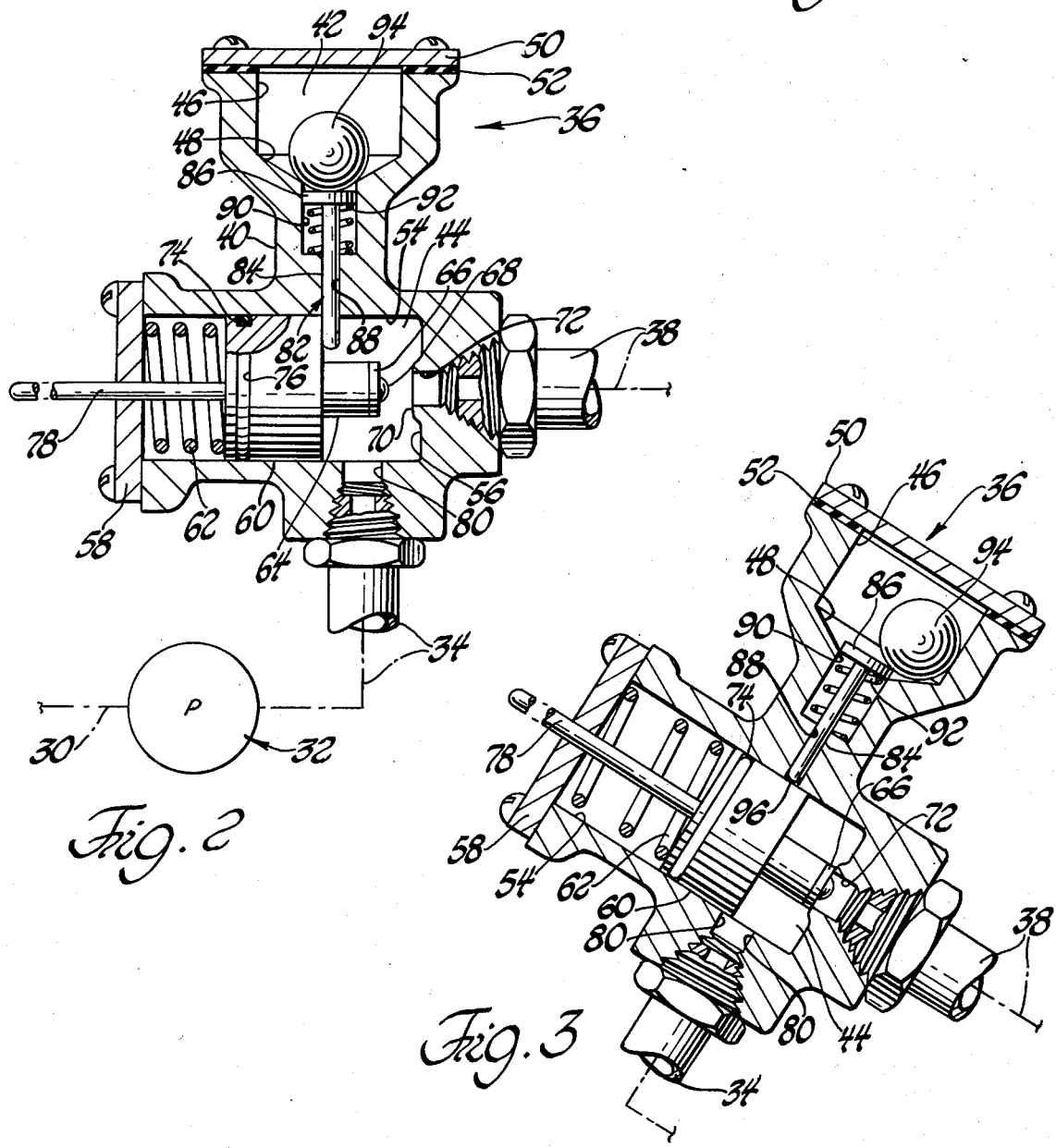
Fig. 2
Fig. 3

SAFETY SHUT-OFF FUEL SYSTEM

BACKGROUND OF THE INVENTION

Generally, automotive vehicles, whether automobiles, trucks, buses or the like, have a relatively high degree of stability even in situations where they are struck from the side by another vehicle at a relatively high velocity. The stability and resistance to such struck vehicle turning over is due to such factors as the relatively heavy weight of the vehicle, its relatively low center of gravity as well as the relatively wide lateral wheel spacing. However, a very small percentage of such automotive vehicles involved in crashes do, nevertheless, severely change their attitude from what would be considered normal.

It has, for many years, been accepted practice to, in automotive vehicles, provide a fuel tank from where a fuel pump would draw fuel and, in turn, supply such fuel to, for example, a fuel metering device on a remotely situated engine.

Often times such fuel metering devices take the form of a carburetor with an associated fuel bowl including a float-valve assembly therein. In many such arrangements there is a vent passage which in effect serves to complete communication as between the interior of the fuel bowl (above the fuel contained therein) and a source of ambient atmosphere as, for example, some point or area within and downstream of the engine intake air cleaner, or, more recently, to a charcoal cannister of the vehicle evaporative emissions control system.

Of the very small percentage of such automotive vehicles which do turn over, roll-over or otherwise severely change their attitude it has been found that a further small percentage thereof have had fuel spill out of the vent tube or passage (or other passages communicating with the engine intake system) and flow over the engine and associated structure. In such instances, after investigations, it has been determined that because of the particular physical attitude or position assumed by the struck vehicle the fuel tank may actually assume an elevation above that of the carburetor fuel bowl. Because of such a change in relative elevations the liquid pressure head of the fuel within the fuel tank becomes sufficient to cause fuel to flow through the fuel pump (even though the fuel pump may not be operating) and into the carburetor fuel bowl from where such fuel, as previously indicated, can spill over onto the engine and associated structure. Such spilled fuel can, in turn, under circumstances giving rise to such a condition, ignite with the resulting flames being capable of starting the entire vehicle to burn. This same, or a similar, situation can occur, although possibly to a lesser degree, in the event of an accident involving vehicle impact only, without roll-over.

Even though the occurrence of such crash situations leading to such fuel-caused fires is rare, nevertheless, the invention as herein disclosed and described is directed to the solution of such as well as other attendant and related problems.

SUMMARY OF THE INVENTION

According to the invention, an automobile fuel system comprising a fuel tank, a fuel pump for pumping fuel from the tank to an associated fuel metering device which in turn meters fuel to an associated engine, has valving means effective for automatically preventing further fuel flow from the fuel tank to the associated fuel metering device upon the associated vehicle sustaining, for example, only a crash impact and/or a severe change in its attitude as, for example, rolling over, and means for enabling the subsequent re-setting of said valving means to an open condition.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and elements may be omitted from one or more views:

FIG. 1 is a side elevational view depicting the general arrangement of an automobile fuel system employing the teachings of the invention and associated fuel consuming engine;

FIG. 2 is a generally longitudinal cross-sectional view, in enlarged scale, of the valve assembly depicted in elevation in FIG. 1; and FIG. 3 is a view similar to that of FIG. 2 except that the entire valving assembly is somewhat rotated as to depict a possible position or attitude assumed by such valving assembly due to a crash impact sustained by the associated vehicle and with the further exception that certain of the elements within the valving assembly of FIG. 3 have been shown in relative positions different from that as shown in FIG. 2.

DETAILED DESCRIPTION OF THE PREFERRED EMBODIMENT

Referring now in greater detail to the drawings, FIG. 1 illustrates an automotive engine 10 as being comprised of an engine block or housing 12 with an intake manifold 14 and a fuel metering device 16 situated generally thereatop. For purposes of discussion, the fuel metering device 16 may be considered to be a carburetor with an associated fuel reservoir or fuel bowl assembly 18 associated therewith. An air cleaner assembly 20 serves to filter the ambient air being supplied to the intake of the carburetor 16.

A power output transmission assembly 22 may be employed for providing power to the vehicular ground-engaging drive wheels such as fragmentarily depicted at 24.

A fuel tank assembly 26, usually remotely situated with respect to the engine 10, is provided with a fuel filler pipe or tube 28 and has fuel supply conduit means 30 leading from the tank assembly to the inlet or intake of a related fuel pump assembly 32. The fuel pump assembly may be of any type (many of which are very well known in the art) and may be driven electrically or mechanically as by a direct mechanical connection with the engine assembly 10.

The outlet or discharge of the fuel pump 32 has conduit means 34 leading from there to the inlet of a valve assembly 36 which, in turn, has its outlet connected to conduit means 38 leading to the inlet of the fuel bowl assembly 18.

Generally, during normal operation, fuel supplied by tank assembly 26 to pump 32 is thereby pumped through valve assembly 36 and into the fuel bowl assembly 18 which may, in turn, employ float acuated and controlled inlet valving means for assuring the admission of only that quantity of pumped fuel as is necessary to maintain a preselected desired level of fuel within such fuel bowl for desired metering characteristics and performance.

Referring to FIG. 2, the valve assembly 36 is illustrated as comprising a housing or body 40 having first and second chambers 42 and 44 formed therein. The first or upper chamber 42 is preferably formed with a cylindrical side wall 46 terminating at its lower end in a conical surface 48 and closed at its upper end as by a suitably secured cover 50 and cooperating annular seal 52. The second or lower chamber 44 may also be defined as by a cylindrical side wall 54 terminating at its right end as in an end wall 56 and being generally closed at its left end as by a suitably secured end wall or cover member 58.

In the preferred embodiment a movable wall or piston-like member 60 is slidably received within chamber 44 and normally urged toward the right end of chamber 44 as by a spring 62 situated within chamber 44 and operatively engaging wall or cover 58 and piston 60. As illustrated, piston 60 comprises a generally cylindrical axial extension 64 which, in turn, carries, at the end thereof, a suitable seal 66 secured thereto as by cooperating retaining means 68. As will become apparent, at times piston 60 will move to the right and in so doing cause seal 66 to sealingly engage a cooperating generally annular seat 70 formed about an outlet conduit or passage 72 in housing or body 40. In the preferred form, piston 60 is provided with an annular seal 74 carried generally by a circumferential groove 76 formed in the cylindrical surface of piston 60. Further, preferably axially aligned extension means 78, operatively connected to or carried by piston 60, extends through cover or wall 58.

An inlet passage or conduit 80, formed in body or housing 40, communicates as between chamber 44 and a threaded connecting end of conduit 34 while, normally, outlet passage 72 communicates as between chamber 44 and a similar threaded connecting end of conduit 38.

A depressable detent or latching means 82 is illustrated as comprising a stem 84 with a head portion 86 carried thereby at the upper end thereof. Stem 84 is slidably guided as within a cooperating 88 formed in housing means 40 while the upper disposed head 86 is generally freely received within the general confines of a recess or chamber-like portion 90. A spring 92 situated in recess 90 and about stem 84 normally urges the head 86 and stem 84 upwardly. A ball weight 94 normally generally cradled by conical surface 48 to thereby sit atop head portion 86 maintains the latching means 82 depressed as to cause the lower end of stem 84 to serve as an abutment or stop against piston 60 to prevent piston 60 from moving fully to the right.

During normal operating conditions, the weight of ball 94 is sufficient to maintain ball 94 substantially in the position illustrated and to overcome the force of spring 92 tending to move stem 84 and head portion 86 upwardly. Consequently, fuel supplied via conduit means 34 to chamber 44 flows past open valve 66 into outlet passage 72 and out through conduit means 38 to the fuel bowl assembly 18.

For purposes of illustration let it be assumed that the associated vehicle has sustained an impact, as by a collision, and because of it has come to rest in a position wherein its engine 10, fuel metering device 16 and fuel bowl 18 are disposed at an elevation lower than that of the fuel tank assembly 26 and, further, that the valving assembly 36 has therefore assumed an inclined position, with respect to the normal horizontal ground line, as generally depicted in FIG. 3.

With reference to FIG. 3, it can be seen that because of the impact alone and/or the severe change in attitude of the vehicle, ball weight 94 has been moved off to the side of latching means 82 thereby eliminating the resistance to upward movement thereof by spring 92.

As spring 92 moves latch head portion 86 and stem 84 upwardly, the end 96 of stem 84 moves into passage 88 thereby permitting spring 62 to move piston 60 to the right and causing valve member 66 to close against seat 70 and close communication as between chamber 44 and conduit 72. Of course, the closing of conduit 72 prevents the further flow of fuel from tank 26 to the fuel metering means 16.

The new position assumed by piston 60, as illustrated in FIG. 3, prevents ball weight 94 from again depressing the latching means 82. However, after the associated vehicle is again righted or its normal attitude is again established, the valving assembly 36 may again be opened without the need of in any way disassembling the valving assembly 36. This will also be true after an impact even where the vehicle maintained its normal attitude. All that needs to be done is to pull the extension 78 axially outwardly, relative to the housing means 40, thereby correspondingly moving piston 60. When extension 78 and piston 60 have been sufficiently moved, as to the position shown in FIG. 2, the weight of ball 94 again depresses latching means 82 so that the stem 84 thereof once more serves as an abutment to the rightward movement of piston 60.

The valving assembly 36 may, of course, be situated in any suitable location on the associated vehicle. To this end, suitable mounting tabs and/or flanges, for example, may be provided on the housing means. However, generally, the closer that such valve assembly 36 is located to the point or points of discharge of fuel to the engine 10, the better the overall results would be because any fuel in the line between the valve assembly 36 and the engine 10 would have a tendency to drain, the volume of such fuel available to so drain would be minimized. Further, it should be evident that if desired the valving assembly 36 could be formed as an integral part of, for example, the fuel metering means 16 and/or the fuel reservoir means 18.

Although only a preferred embodiment of the invention has been disclosed and described, it is apparent that other embodiments and modifications of the invention are possible within the scope of the appended claims.

I claim:

1. In a vehicle having a fuel consuming engine, the combination comprising fuel tank means, fuel metering means for metering the rate of flow of said fuel to said engine, means effective for supplying a flow of said fuel from said fuel tank means to said fuel metering means, and safety valving means effective for at times preventing flow of said fuel from said fuel tank means to said engine, said safety valving means being thusly effective upon said vehicle experiencing a certain impact and/or abnormal attitude condition, said safety valving means comprising reset means effective for again establishing said flow of said fuel from said fuel tank means to said engine after said safety valving means has prevented said flow of said fuel from said fuel tank means to said engine, said safety valving means comprising housing means, fuel inlet means formed in said housing means, fuel outlet means formed in said housing means, fuel passage means interconnecting said fuel inlet and outlet means, movable valve member means adapted to at times close communication as between said inlet and outlet means to thereby terminate flow of said fuel from said fuel inlet means to said fuel outlet means, gravity responsive means normally effective for maintaining said valve member means in an open position as to thereby maintain said communication as between said inlet means and said outlet means, said gravity responsive means being effective upon said vehicle experiencing said crash condition to permit said valve member means to close said communication, said reset means being operatively connected to said valve member means and effective to again open said communication after said communication has been closed by said valve member means, said gravity responsive means comprising a relatively heavy ball-like member, said housing means comprising chamber means, said chamber means comprising a lower disposed wall of generally depressed contour, said said ball-like member being contained within said chamber means and in normally a first position generally seated on said lower disposed wall, said ball-like member being effective when in said first position to operatively engage said valve member means to thereby maintain said valve member means in said open position, said ball-like member also being effective to be moved to a second position generally eccentrically disposed to said first position upon said vehicle experiencing said crash condition, said ball-like member when moved to said second position being ineffective to maintain said valve member means in said open position.

2. In a vehicle having a fuel consuming engine, the combination comprising fuel tank means, fuel metering means for metering the rate of flow of said fuel to said engine, means effective for supplying a flow of said fuel from said fuel tank means to said fuel metering means, and safety valving means effective for at times preventing flow of said fuel from said fuel tank means to said engine, said safety valving means being thusly effective upon said vehicle experiencing a certain impact and/or abnormal attitude condition, said safety valving means comprising reset means effective for again establishing said flow of said fuel from said fuel tank means to said engine after said safety valving means has prevented said flow of said fuel from said fuel tank means to said engine, said safety valving means comprising housing means, fuel inlet means formed in said housing means, fuel outlet means formed in said housing means, fuel passage means interconnecting said fuel inlet and outlet means, movable valve member means adapted to at times close communication as between said inlet and outlet means to thereby terminate flow of said fuel from said fuel inlet means to said fuel outlet means, gravity responsive means normally effective for maintaining said valve member means in an open position as to thereby maintain said communication as between said inlet means and said outlet means, said gravity responsive means being effective upon said vehicle experiencing said crash condition to permit said valve member means to close said communication, said reset means being operatively connected to said valve member means and effective to again open said communication after said communication has been closed by said valve member means, said gravity responsive means comprising a relatively heavy ball-like member, said housing means comprising chamber means, said chamber means comprising a lower disposed wall of generally depressed contour, said ball-like member being contained within said chamber means and in normally a first position generally seated on said lower disposed wall, said ball-like member being effective when in said first position to operatively engage said valve member means to thereby maintain said valve member means in said open position, said ball-like member also being effective to be moved to a second position generally eccentrically disposed to said first position upon said vehicle experiencing said crash condition, said ball-like member when moved to said second position being ineffective to maintain said valve member means in said open position, and spring means operatively engaging said valve member means, said spring means being effective to continually resiliently urge said valve member means away from said open position.

3. A safety shut-off valve assembly, comprising housing means, fluid inlet means formed in said housing means, fluid outlet means formed in said housing means, fluid passage means operatively interconnecting said fluid inlet and fluid outlet means, valve seat means formed generally in said fluid passage means, movable valve member means situated generally in said fluid passage means and effective to at times move toward said valve seat means to close thereagainst and thereby terminate communication as between said fluid inlet means and said fluid outlet means, detent-like latching means normally operatively engaging said valve member means to thereby prevent said valve member means to close against said valve seat means, gravity responsive means normally effective for maintaining said latching means operatively engaged with said valve member means for preventing said valve member means from closing against said valve seat means, said gravity responsive means being effective upon experiencing a sufficiently high order magnitude of shock to permit said latching means to become operatively disengaged from said valve member means to thereby permit said valve member means to close against said valve seat means, and reset means operatively connected to said valve member means to enable said valve member means to be moved away from said valve seat means after said valve member means has closed against said valve seat means.

* * * * *